United States Patent [19]
Davis

[11] Patent Number: 5,288,981
[45] Date of Patent: Feb. 22, 1994

[54] METHOD AND APPARATUS FOR ENCODING MACHINE READABLE SERIAL ENCRYPTEDMAGNETIC DATA

[75] Inventor: Michael L. Davis, Amherst, N.Y.
[73] Assignee: Allsafe Company, Inc., Buffalo, N.Y.
[21] Appl. No.: 782,130
[22] Filed: Oct. 25, 1991
[51] Int. Cl.$^5$ .............................................. G06K 7/08
[52] U.S. Cl. ................................. 235/449; 235/493; 360/2
[58] Field of Search .................. 235/449, 493; 365/97; 360/2

[56] References Cited

U.S. PATENT DOCUMENTS

| | | | |
|---|---|---|---|
| 3,788,617 | 1/1974 | Barney | 235/493 |
| 4,055,746 | 10/1977 | Peterson | 235/493 |
| 4,455,484 | 6/1984 | Whitehead | 235/493 |
| 5,160,833 | 11/1992 | Nakahara | 235/449 |

Primary Examiner—Edward P. Westin
Assistant Examiner—S. B. Allen
Attorney, Agent, or Firm—Sommer, Oliverio & Sommer

[57] ABSTRACT

The present invention provides a method and apparatus for encoding and detecting data from magnetically encoded access cards. The invention includes a control unit (1) having an access card slot (4) communicating with a microprocessor (11) and sensor (3). A barium ferrite access card (5) magnetically encoded in a particular grid pattern is interposed within the card slot, and the encoded grid pattern is then detected and "read" by the sensor. The encoded data in grid form is then transmitted to the microprocessor which, in turn, assigns to the magnetically encoded grid representation a numeric value. This numeric value is then compared with a list of values stored in the microprocessor and if the detected and translated numeric value corresponds to a stored value, the microprocessor, directly or indirectly, emits a signal to activate or deactivate a device to be controlled (10).

22 Claims, 3 Drawing Sheets

METHOD AND APPARATUS FOR ENCODING MACHINE READABLE SERIAL ENCRYPTEDMAGNETIC DATA

TECHNICAL FIELD

This invention relates generally to access control devices for verifying the credentials of personnel through the use of access cards and specifically, to an improved method and apparatus for encoding and detecting access card data to control ingress and egress from a particular area or operation of a particular device.

BACKGROUND OF THE INVENTION

It is often desirable to limit access to enclosed areas through the use of electronically or otherwise controlled access doors or to restrict the operation of equipment or machinery, e.g., computers, copying machines, parking facilities, etc. Automatically limiting access to a selected number of individuals through the use of electronic or mechanical means results in significant economies through avoidance of the need for guards, security personnel or outside security contractors. Moreover, automatic access devices such as that contemplated by the instant invention are extremely flexible and may be used in connection with a variety of applications aside from limiting access to a particular room or area.

In this regard, numerous electronic systems typically using "card keys" or access cards have been developed over the years for industrial and commercial applications. Access cards, typically comprised of a planar layer of barium ferrite, or other similar materials, interposed between sheets of vinyl, stainless steel or other magnetically inert material, are generally used to "key" the system. Specifically, a number or other code is magnetically represented on the face of the barium ferrite layer of the card through a coding system. The card is then inserted, directly or by wiping, or is interposed within a control device adjacent or proximate to an area to be accessed (e.g., a doorway and door) and is electrically linked with the door lock or operating system of the device to be controlled. The slot has a singular or series of sensors, and the sensors are activated to read the encoded magnetic data on the face of the card from the data carrying medium of the card. The sensors work in various ways; for example, some sensors detect changes in resistance or conductance in the presence of a magnetic field. Accordingly, the sensor will typically "read" the series of magnetically encoded points on the face of the card as a binary number, i.e., a series of 0's or 1's.

For example, a typical card might consist of two columns of data points along the card surface. One column serves as the "clock," while the other serves as the encoded data. When the sensor detects a magnetic point in a particular row of the "clock column," the sensor then looks to the data column in the same row to determine whether the point is magnetized or not. If magnetized, the sensor might be thought to interpret that point as a "1" in a series of binary digits. The sensor reads each row of the various columns in an identical manner and ultimately generates a binary number comprised of a series of 0's and 1's.

In the prior art, this binary string is communicated to a programmable microprocessor usually within the main control unit having storage and memory capability and equipped to recognize the binary string and, if appropriate, issue a corresponding command signal, directly or indirectly, to the device to be controlled, e.g., a door lock. The microprocessor may be programmed to grant access (i.e., activate) a particular device to be controlled upon receiving from the sensor a certain number or numbers represented in binary form, while excluding (i.e., deactivating or failing to activate) the device to be controlled in response to still other received binary strings. Accordingly, access or operation may be selectively limited to those having access cards that are appropriately encoded.

In general, electronic access systems have proved to be fairly reliable and secure. Nonetheless, a number of operational problems have been identified. For instance, it is critical that the sensor accurately "reads" the encoded data in the data carrying medium of the access card. Often times, an inaccurate "read" is obtained on account of improper or careless insertion of the access card into the slot containing the sensor or series of sensors for detecting the encoded information or even wearing of the card or mechanical guides directing the card into the slot. Second, security may be breached and the access card circumvented through counterfeiting or unauthorized duplication of access cards, especially critical in high security (e.g., governmental) applications.

For example, in the prior art, data is detected by the sensors as the card is inserted into the access slot. Accordingly, "play" from side to side or uneven insertion can result in a "misread." In response to this problem, the prior art also includes a slot having a switch at its internal end. The switch must be first activated by the edge of a fully inserted card prior to sensing of the encoded data. This solution, of course, results in further complication of the apparatus, as well as additional expense attendant to the switch. Maintenance problems are similarly encountered. Still further, insertion of the card upside down or backwards results in a "misread." In short, a cardholder properly permitted access to the device to be controlled can nonetheless be denied access for failure to properly and carefully insert the access card. This problem remains in the prior art and as yet, has not been adequately solved in an economical and efficient manner.

Counterfeiting or unlawful duplication of access cards has also proved troublesome, especially with regard to high risk and security conscience applications. Accordingly, there have been attempts in the art to disguise data by, for example, altering polarities, reading only certain discrete points on the face of the access card, reprogramming the microprocessor on a regular basis, or exchanging access cards frequently. These efforts, however, have proved inconsequential to an effective resolution of the counterfeiting/duplication problem.

In particular, since many devices are based upon a binary string of numbers, it is extremely difficult to disguise data arranged in only two columns. Moreover, the data density capable of being represented on such a card is low thereby making the access card code easier to decipher, copy or counterfeit. In addition, the low data density results in decreased flexibility in applications requiring a large number of access cards.

Still further, the prior art has also encompassed various systems for improving the "read" accuracy of the devices. For instance, a "two read" system, known in the art, provides for reading of the data after detection of a switch closure or sentinel at the front end of a card and the reading of the card again as it is pulled out of the slot. The two readings are then compared and, if identical, access is granted. When the comparison is identical, there is, of course, a high degree of accuracy and reliability of the reading. However, the "two read" system is prone to a high number of "misreads" attendant to the insertion and excursion of the card from the slot. A "one read" system has also been used in the art. This requires the presence of a switch or sentinel, discussed above, at or near the end of the slot. Side to side movement of the card or play in the insertion of the card, may result in numerous misreads under this system.

Accordingly, the instant invention provides a method and apparatus to improve upon the accuracy of the "reads," as well as allowing the encoded data to be further disguised and protected from unlawful or unauthorized copying or duplication.

DISCLOSURE OF THE INVENTION

The invention generally comprises a method and apparatus for encoding and ultimately translating access control data represented on control devices such as access cards or keys. The invention generally includes a control until (e.g., 1), having a programmable microprocessor (e.g., 11), with memory capability (e.g., 2); sensors (e.g., 3), usually a magneto-resistive type interposed within the control unit and communicating with the microprocessor; an access slot (e.g., 4) interposed within the control unit and having at least one entrance portion exposed to the outside of the control unit and adapted to slidably receive an access card (e.g., 5) therein. The access card typically comprises a planar layer of barium ferrite (e.g., 6) interposed within two layers of a magnetically inert material such as vinyl, polyester, or stainless steel as (e.g., 7). The access card may also be in the form of a "key" or other substantially planar, insertable member. In the typical embodiment, a switch (e.g., 8) is interposed at the far internal end of the access slot and is adapted to be tripped by the inserted edge of the access card or key and the sensor then "reads" the data encoded on the card as the card is removed from the slot.

The access card is magnetized at certain discrete points along the barium ferrite medium surface in a grid pattern of rows and columns (e.g., 16). In the preferred embodiment, one of the columns of such grid includes, at either end, a sentinel point (e.g., 9, 9a) in advance of the remaining grid points. Moreover, none of the other points within the sentinel column contains any data. Each of the other columns of the grid of the access card contains a series of magnetized points in various patterns.

In operation, upon detecting the sentinel, the sensor reads the data points as defined by a particular row and column and further, reads such points continuously as the card is inserted in or, alternatively, as the card is pulled out after tripping the switch, or after detecting each of the sentinels (9, 9a) in the absence of a switch.

The microprocessor has stored in memory various matrices having numerical values assigned to each of the data points (e.g., FIGS. 3, 4 and 5), the number of such matrices corresponding to the number of columns of data. Accordingly, the microprocessor, depending upon the sensed column of the sentinel, is able to determine which of the number matrices is needed to translate the encoded data. Upon input of the position of the sensed magnetic data, the microprocessor then translates the points into a number and compares such translated number with preprogrammed data to determine whether or not a signal should be sent to the device to be controlled (e.g., a door lock).

The microprocessor may be further programmed to only translate data sensed by the sensor that appears in a particular column or row (e.g., the row or column having the highest or lowest value) and accordingly, disguishing of the data is relatively easy. Moreover, the data density is increased since the card may encompass a multitude of rows and columns of data depending upon the particular application. In addition, as set forth below, the apparatus may be modified to eliminate the switch and to rely upon sensing of the sentinel at either end of the card to determine whether the data should or has been accurately "read."

Accordingly, the general object of the invention is to provide an access card that may be readily programmed to be sensed and ultimately translated by a microprocessor to determine whether access should be granted to a particular cardholder.

Still another object of the invention is to provide an access card in which the data may be effectively "disguised" and thereby rendered safe from duplication.

Still another object of the invention is to provide an access device and apparatus that may be adapted to be used with an apparatus without a switch thereby decreasing the cost or maintaining efficiency of the device.

These and other objects of the invention will become apparent to one of ordinary skill in the art from the specification and claims that follow.

MODE(S) OF CARRYING OUT THE INVENTION

At the outset, it should be clearly understood that like reference numerals are intended to identify the same structural elements, portions or surfaces consistently throughout the several drawing figures, as such element, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms"horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" generally refer to the orientation of a surface relative to its axis of elongation, or axis of rotation as appropriate.

The present invention generally provides an improved method and apparatus for encoding, translating and sensing data represented on an access card to selectively limit, for example, access to a particular area or device.

Figure 2:
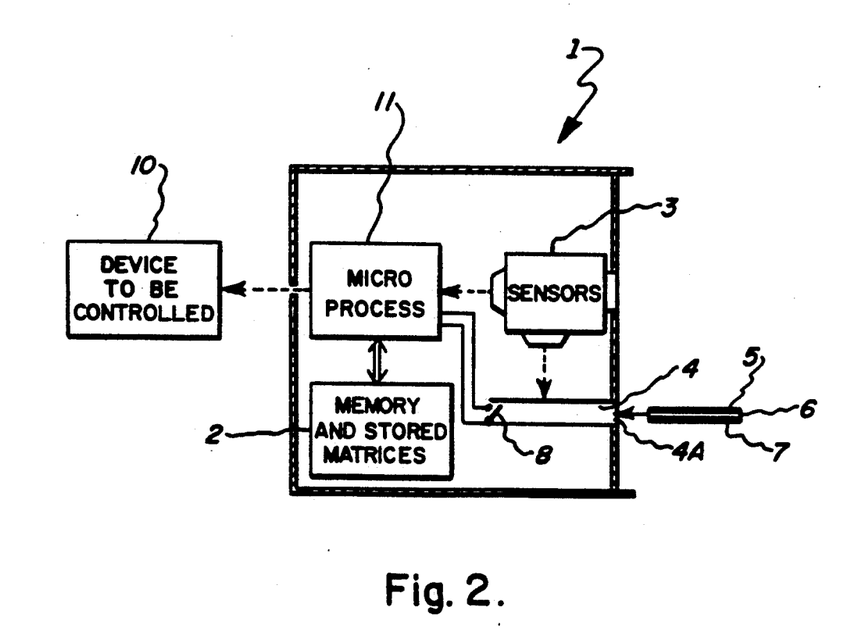
FIG. 2 is a block diagram of the components of the invention combined with a section of the control unit, access card slot and access card.

Turning first to FIG. 2, the general components of the device are shown in block diagram form interposed within a cross section of the control unit. In particular, the preferred embodiment comprises a control unit 1, which is, in effect, a box-like hollow container for encasing the components of the device. The control unit is typically configured of metal or high strength plastic to avoid vandalism or circumvention and to insure the continued integrity of the enclosed electronic components.

Continuing to advert to FIG. 2, basic components of the apparatus comprising the invention are illustrated in block form for clarity. In particular, the control unit is shown to contain an access slot, 4, of generally rectangular cross-section capable of slidably receiving an access card or other substantially planar and relatively thin access member, 5. The access slot is open to the outside of the control unit at one or more points, for example, 4a, and comprises in the preferred embodiment a thin-walled, internally positioned groove for accepting the access card. The typical slot is configured with a top and bottom facing planar surface and side surfaces capable of accepting direct horizontal or vertical insertion of the access card (depending on the orientation of the control unit) while allowing some movement of the access card in the vertical or horizontal direction in order that the access card may be properly and easily inserted. This provides for either an "insert" type of reader wherein an access card is inserted into an opening (i.e., a slot) or a "swipe" type reader wherein the access card is slidably moved along passed the sensors in a groove or "channel."

Contained within the control unit and communicating with the access card slot is a sensor, 3, adapted to "read" data encoded on the access card and to transfer such data to a microprocessor, 11, for translation and for the issuance of further commands when appropriate to the device to be controlled, 10.

Specifically, the sensor comprises a magneto-resistive device which detects specific and discreet changes in resistance attributable to the presence of a magnetic field at a point or area using the Hall effect. Although incapable of detecting polarity, the magneto-resistive sensor is extremely sensitive and can quite efficiently detect magnetic data points at discrete intervals along a surface such as the access card and transmit the position of the same to the microprocessor. Other sensors are, however, capable of detecting the polarity of each of the detected data points.

Further, as shown schematically in FIG. 2, the sensor is positioned above the access card slot and is typically embedded within the top planar surface of the slot at or near its open end. This proves advantageous for a number of practical reasons; for example, the "electronics" within the control unit are unseen and "buried" thereby decreasing the chance of vandalism and also, are less suspectable to dirt, dust or grime which naturally falls downwardly away from the top planar surface of the slot and sensor position. Moreover, in some applications, positioning of the sensor along the top surface of the access slot may obviate the need for a bottom surface; i.e., the slot may, in effect, comprise only a top and side surfaces further simplifying the structure of the device. It should also be understood that the access slot may be devised to accept the access card through a horizontal or vertical "wiping" of the card across the slot surface. In other words, the access slot may, in fact, be a single planar surface or two spaced horizontal or vertical facing planar surfaces capable of receiving the access card as it is "wiped" through the space between the slots in a vertical or horizontal direction. In such embodiment, the sensors are appropriately placed along the surface to detect the data represented on the access card.

Continuing to advert to FIG. 2, the microprocessor 11, is the operative portion of the device and is responsible for the receipt and translation of all data "read" by the sensor and also, transmits signals to the device to be controlled, 10. The device to be controlled may be a door lock, a parking lot entrance system, a computer, a copying machine, ATM money dispensing machine or the like. As a practical matter, any device that may be activated through the use of an electrical signal may be appropriately controlled by the present invention through communication with the microprocessor and an appropriate signaling mechanism.

In the preferred embodiment disclosed in FIG. 2, the microprocessor, and attendant electronics (not shown), communicate with both the sensor and a switch, 8, located at the far internal end portion of the access slot, 4, as well as with the device to be controlled, 10. The microprocessor, much like a typical computer, is adapted to be programmed with certain stored data in memory and also, is adapted to perform various comparisons and numeric functions described in detail below. In addition, the microprocessor is adapted to send electronic signals, where appropriate, to the device to be controlled. This can be accomplished directly or through an intermittent signaling device, not shown. Depending upon the data received from the sensor as a result of the "reading" of the encoded access card, the microprocessor will perform various functions and cause certain signals to be emitted in response thereto.

Figure 1:
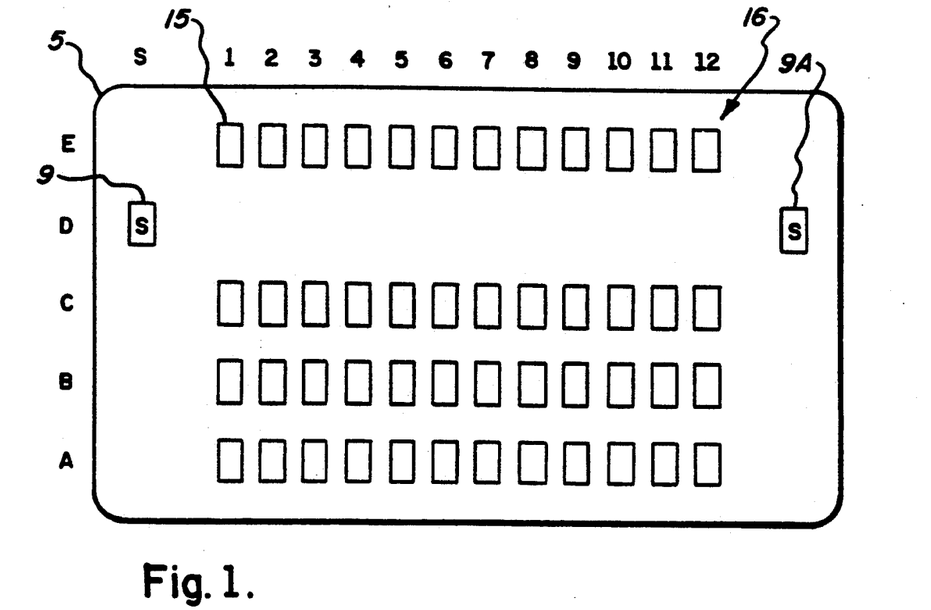
FIG. 1 is a schematic of an access card having five rows and twelve columns with a sentinel in column D.

Adverting now to both FIGS. 1 and 2, the invention is further shown to comprise and attendant access card, 5, adapted to be magnetically encoded in a preselected pattern for initiating operation of the device to be controlled. The access card physically comprises a thin-substantially planar member much like a credit card, bank card or the like. In particular, the access card is comprised of a thin sheet of barium ferrite, 6, interposed within two outside sheets of vinyl, 7, or other magnetically inert material. To the naked eye, the access card appears to be a single, thin planar plastic or vinyl member, and the barium ferrite is not readily detectable or visible. The barium ferrite layer is, however, capable of being magnetized along its surface at discrete points forming, for example, a grid pattern having rows and columns and, as is set forth below, may be selectively magnetized to represent encoded data for control purposes. The vinyl surfaces, however, are magnetically inert; i.e., they are not easily magnetized and accordingly, form an ideal surface for encasing the encoded barium ferrite layer of the access card. Moreover, the vinyl or plastic acts as a durable coating for the thin barium ferrite containing the encoded data.

Adverting to FIG. 1, a typical access card is shown in schematic, representing a possible coding scheme for the encoded barium ferrite layer of the access card. Specifically, data is encoded on the access card in a matrix, 16, comprised of a series of columns (A through E) and rows (1 through 12). The intersection of each row and column is defined by a possible data point; for example, column E, row 1 shown by reference numeral 15. Depending upon the encoding scheme employed, each of the matrix points may or may not be magnetized, i.e., have a data point present. Moreover, FIG. 1 demonstrates the use of a sentinel point, 9 or 9a, shown to be positioned in column D of matrix, 16. Specifically, the sentinel points are positioned in a particular column just forward or ahead of the data rows. No data is encoded in the rows of the sentinel column and, for detection purposes, the chosen column acts strictly as a sentinel, explained in detail below.

In practice, any number of points in a particular row are magnetized and accordingly, are determined to be in a "data" state for purposes of sensing by the sensor. The sensor, however, will merely detect and record the presence of a magnetic point at the intersection of each row and column, but does not assign or calculate any numeric value dependent thereon. Only after the detected encoded data is transmitted to the microprocessor is the encoded data translated into a numeric value for purposes of operation of the device to be controlled.

Specifically, in operation, an encoded access card is inserted into the card slot to its end point thereby "tripping" the switch, 8, disclosed in the preferred embodiment of FIG. 2. By engaging the switch, the microprocessor is signaled to actuate the sensor and the data is read as the access card is extracted from the access slot. The use of the switch and disclosed "one read" method may be varied by incorporating sentinel points 9 or 9a at either end of the access card. Specifically, in another embodiment of the invention, the sensor is operatively arranged to detect the presence of the first sentinel as the card is inserted into the slot and to "read" the encoded points on the card after the sentinel is detected. Still a third embodiment of the invention includes the use of the end sentinel point 9a disclosed in FIG. 1. In this embodiment, the sensor is operatively rearranged to "read" data points only after detecting the last sentinel, 9a, positioned at the outside end of the access card as the card is fully inserted and then pulled from the access card slot. This method is particularly desirable since a better "read" will generally result as the access card is smoothly pulled from the slot when compared with direct insertion of the access card into the slot. Finally, the disclosed embodiment may also incorporate a "two-read" system employing both of the sentinel points to the exclusion of any switch. In particular, the sensors are operatively arranged to detect the first sentinel point and then read the data encoded on the card. Thereafter, upon detecting the second sentinel, the sensors will again read the encoded data as the card is pulled from the access slot. If the two "reads" match, the encoded data is then transmitted to the microprocessor for translation and ultimately, signal generation if appropriate.

Thus, the present access card configuration is adaptable for use with existing "switch" based devices and also, may be flexibly adapted for use in the absence of switches by incorporating one or both sentinels thereby simplifying the system, detection mechanism and process.

Detection, disguising and translation of the encoded access card data is accomplished, in general, by the cooperation of the programmable microprocessor and sensor. In particular, in each embodiment of the invention, once activated, the sensor will detect ("read") the position of the magnetized points along the surface of the access card, including the position of the sentinels, when applicable, and transmit the grid position of detected and encoded data to the microprocessor for translation. The microprocessor, in turn, is programmed to recognize the grid position of transmitted encoded points and to translate the grid into a numeric value. This value is then compared with a pre-programmed list of stored values to determine whether the microprocessor should emit the signals required to activate the device to be controlled. The present invention contemplates a novel method for encoding and translating the encoded data to thwart counterfeiting and to disguise the encoded data with an eye toward preventing security lapses without the need for consistent microprocessor reprogramming or reissuance of access cards. This novel and unique method for encoding and translating the access cards is generally described in the flowchart of FIG. 6 and is specifically illustrated by example in FIGS. 3 through 5.

Figure 3:
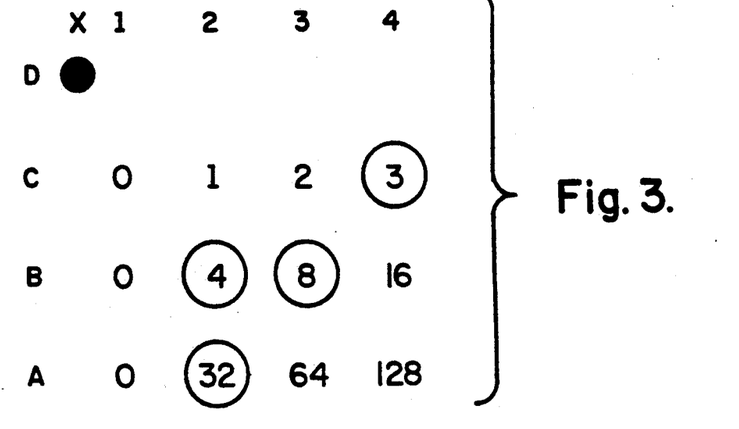
FIGS. 3 through 5 are schematics of a programmed matrix residing in the memory of the microprocessor, such matrix having four columns and four rows, each point of which is assigned various numeric values in base 4.
Figure 4:
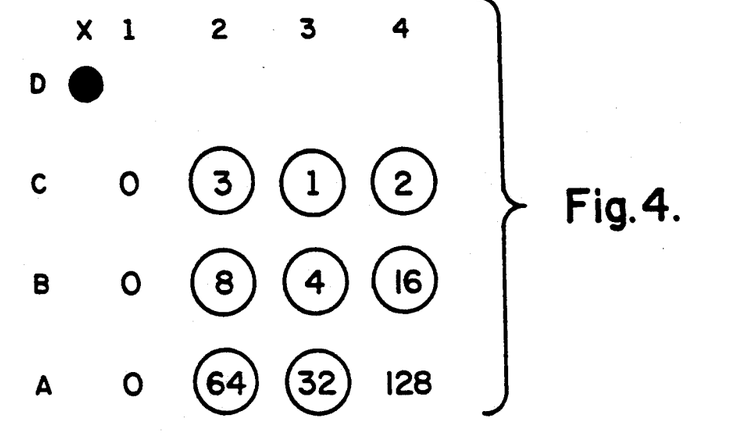
Figure 5:
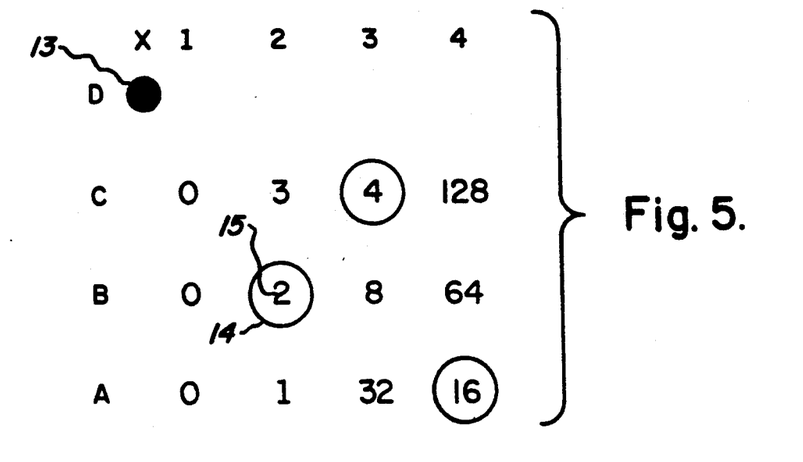
Figure 6:
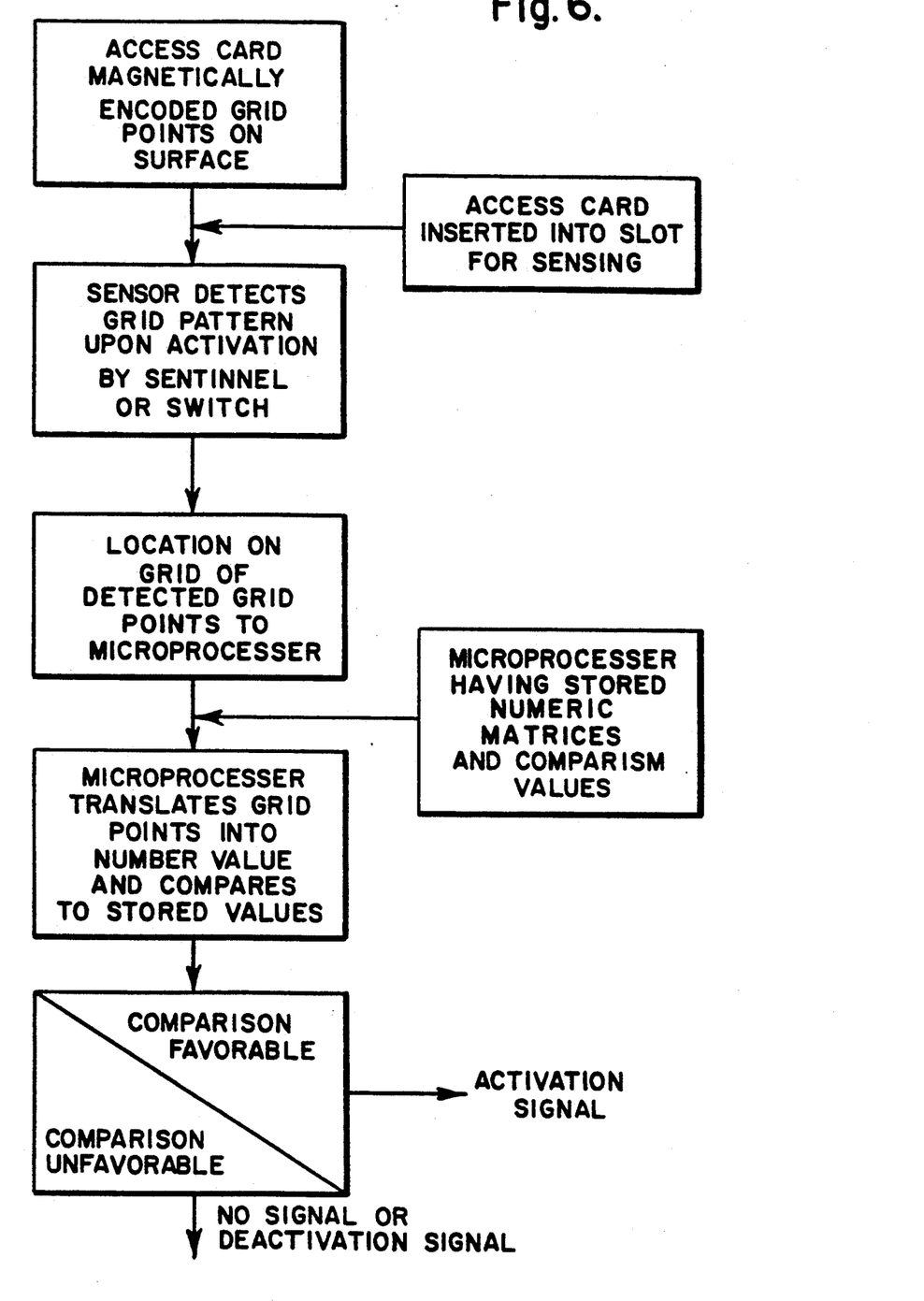
FIG. 6 is a flowchart describing the steps of the method for encoding and translating the encoded data through use of the access card, sensors and microprocessor.

In particular, FIGS. 3 through 5 depict, in simplified form, a matrix corresponding to an access card grid having four rows (A through D), four columns (1 through 4) and a column, "x," for the sentinel point. Turning specifically to FIG. 5, the sentinel is indicated by a solid circle, 13, in row D, row "x." Magnetized points along the access card surface are represented by circles, 14, enclosing grid values, 15, discussed in detail below.

Continuing to advert to FIG. 5, under the novel method of the invention, the sensor will typically detect a data point (i.e., a magnetized point) at those points along the access card grid having a circle (i.e., row A, columns 2 and 4; row B, column 2; row C, column 3) while row 1 contains all 0's. No data is encoded in the sentinel column. The sensor is adapted to detect the location of each of the magnetized points, as well as their position along the surface of the access card and also, to transmit the position of the magnetized points to the microprocessor for translation and signal generation, if appropriate.

In this regard, stored within the microprocessor are a series of matrices corresponding to the face of the access card; i.e., of equal columnar and row dimensions, such as those in FIGS. 3 through 5. A separate matrix exists for each possible sentinel position. For example, if the access card is configured like that of FIG. 5 (i.e., four columns and four rows) the sentinel may be placed before each of the four rows and accordingly, four separate matrices are stored within the microprocessor. Stored, too, as part of the microprocessor matrices are numeric values assigned to each of the points of the matrix. The numeric matrix specifically comprise values of a number base equal to the number of columns of the matrix. In FIG. 5, this number base is base 4 (i.e., the digits 0, 1, 2 and 3, together with the powers thereof). Using base 4 representations and assuming four rows in the matrix, FIG. 5 shows that all numbers from 0 to 128 may be depicted by a combination of numbers on the matrix. Accordingly, irrespective of the position of the sentinel, the microprocessor is programmed to have at hand a series of four matrices corresponding to the encoded grid data read from the access card by the sensor and corresponding numeric valves assigned to each of such encoded magnetic points by the "lay over"

of the appropriate matrix onto the detected grid point positions.

Using each of the matrix numeric values assigned to each of the grid points, it is possible for the microprocessor to compile a numeric value from the encoded data read by the sensor by applying the appropriate matrix to the encoded data and then comparing the numeric value with a series of stored values previously programmed to determine whether the device to be controlled should be activated or not.

Continuing to advert to FIG. 5, an easy case of application of the novel coding and translation method is illustrated. First, the sentinel is read to be in row D so the microprocessor chooses the numeric matrix having assigned numeric data points in rows A through C only. The sensor will, however, "read" not only the columnar location of the sentinel, but also the presence of a magnetic point in row B, column 2; row C, column 3; and row A, column 4. With this data information received from the sensor, the microprocessor will then assign numeric base 4 matrix values of 2, 4 and 16 respectively to each of the "read" and encoded data points. These numbers total the base 4 number of 22. The microprocessor will then compare this value to a preprogrammed series of values to determine if the number 22 is present. If so, the microprocessor will emit a signal causing the device to be controlled, 10, to be actuated for use or access.

Although efficient, the method illustrated by the encoding scheme of FIG. 5 would likely be easily dissected, counterfeited and copied. Accordingly, FIGS. 3 and 4 illustrate a more complex embodiment of the novel method for encoding and translating data which greatly enhances the ability to disguise the data.

Turning particularly to FIG. 3, the sensor "reads" data in access card grid points at row A, column 2; row B, columns 2 and 3; and row C, column 4 after detecting the sentinel point in row D. This encoded data grid is transmitted to the microprocessor for translation. To further disguise the encoded data, the microprocessor may be flexibly programmed to, for example, translate only the highest numeric value in each column; for example, in column 2 of FIG. 3, the value 32 rather than the value 4. Using this translation technique, the numeric value depicted in FIG. 3 would be 43. Similarly, the microprocessor may be flexibly programmed to only translate and assign numeric values to points appearing in those columns intersection row B; for example, in FIG. 3 the value of 12 (4+8). The microprocessor could also be flexibly programmed to select only the lowest value of a column where there are multiple data points; for example, in FIG. 3 column 2 would be assigned the value 4 and the number generated would be 15 (4+8+3). Indeed, another set of vectors could be formed for each of the possible sentinel positions storing, on a column by column basis, whether the highest or lowest value of each is read.

FIG. 4 is a further illustration of the use of multiple data points per column combined with selective programming of the microprocessor and application of matrix values to disguise the encoding system. For example, choosing the highest value per column of FIG. 4 would produce a numeric value of 102 (64+32+16). Choosing the lowest value per row would produce a value of 6 (3+1+2).

Clearly, the novel method of encoding and translating the data through the use of the flexible programming of the microprocessor results in a myriad of possible combinations and values, even using the limited 4×4 matrices described in FIGS. 3 through 5. Specifically, the matrices may be varied by the position of the sentinel, by the random assignment of numeric values to each of the data points on the matrix, by the actual magnetic coding of the grid points appearing on the face of the access card and further, by the programmed translation method contained in the microprocessor. Additionally, since the described encoding scheme and apparatus may be modified to recognize polarity of the encoded data (i.e., whether the magnetic spots have a north or south value) values based upon polarity can, too, be randomly assigned to additional matrices to indicate which polarity is to be considered a "one" and which to be considered a "zero" on a spot-by-spot basis. In short, accurate detection for the purposes of counterfeiting pr subverting the encoding system is practically impossible. Moreover, by extending the scope of the matrix to additional columns and multiple rows, a user may increase the data density, assign and translate a multitude of numeric values for any number of users while making it extremely difficult for circumvention or subversion of the system, especially in high security applications.

Further, the use of the sentinel system obviates the need for the mechanical switch typically seen in the prior art. However, the present embodiment may be used with those devices nonetheless. New devices, without the added complexity of the switching mechanism, will be equally efficient and accurate based upon the detection of the sentinel either once or twice depending upon the detection method chosen. Obviating the need for the switch, of course, lowers the cost of manufacturing the device, as well as decreases the maintenance costs associated with the switching mechanism and added electrical components.

A final refinement of the method and apparatus includes the ability to insert the card "upside-down" or from either end without affecting the ability of the invention to detect and translate the encoded data. In particular, since one of the embodiments discussed includes the use of a sentinel at either end of the access card, and a column containing no data, the microprocessor may be flexibility programmed to apply a particular matrix whether the sentinel point (i.e., the column containing no data) appears in complementary columns dependent upon the orientation of the inserted card; e.g., in FIG. 3, rows A and D or rows B and C. Accordingly, the method and apparatus comprising the invention provides further flexibility and ease of use because the card may be inserted face up or face down without any resultant "misread" or data entry error. Note, of course, that the data encoded in the columns must be symmetrically laid out such that "flipping" of the access card will not provide an inaccurate or erroneous reading.

Accordingly, the method and apparatus of the present invention is a dramatic improvement over the prior art in that it improves the efficiency of the apparatus used to detect access card data and translate the same and further, employs a method of encoding and translating the data that forestalls and practically thwarts any efforts at counterfeiting or circumventing the system. Moreover, the present method allows for an almost infinite density of data thereby increasing the flexibility and use of the system with multiple users without the issuance of duplicate cards or constant reprogramming.

Modification

The present invention, although described in the specification in the form of a preferred embodiment and a number of variations thereof is, of course, not limited thereto.

For example, although the preferred embodiment describes the access card as a substantially planar member of barium ferrite, it is possible to substitute other magnetic materials and to vary the shape of the access card depending upon the type of access slot envisioned by the control unit. For example, access keys having magnetic data encoded thereon are already known in the prior art and may be easily adapted for use with the present invention.

Moreover, although the preferred embodiment is described in terms of a data matrix having four rows and four columns, and numeric values predicated upon a base 4 number system, the rows and columns of the matrix and attendant numeric base could, of course, be expanded and increased to other number bases, including base 10, as desired.

Similarly, as described above, the sensors described in the preferred embodiment are those of the magneto-resistive type; however, other sensors, perhaps detecting polarity, could be easily adapted to the invention and method by one of ordinary skill in the art; e.g., by having a certain polarity, or even magnetic strength as measured by an analog sensor, to indicate the presence or absence of data.

Finally, the shape and configuration of the access card slot, as well as the characteristics, programming and memory of the microprocessor can be flexibly varied to correspond and comport with the particular representation of the encoded data on the surface of the access card chosen.

These, of course, are not the only modifications envisioned by the invention, and one of ordinary skill in the art will readily appreciate that the invention can be modified and changed without deviating from the spirit and intent set forth in the specification and following claims.

I claim:

1. In an electronic access system having one or more sensors for detecting magnetically encoded data represented on control cards and a programmable microprocessor for transforming said detected encoded data into useable data or concomitant commands, the method of encoding and detecting said access card data comprising the steps of:

providing an access card having a substantially planar surface with a layer of magnetic media, said access card adapted to be selectively magnetized along said magnetic layer of said planar surface;

providing a grid on said access card having a plurality of rows and columns, said grid having defined points at the intersection of said rows and columns, each of said grid points adapted to be selectively magnetized;

providing a sentinel point at either end of said access card, said sentinel point adapted to be magnetized and positioned in advance of said grid directly above one of said rows;

magnetizing said sentinel;

selectively assigning to each of said grid points, except those in the row containing said sentinel, a numeric value represented in a number base equal to the total number of rows in said grid;

selectively magnetizing said pre-selected grid points such that said detected magnetic points equal a pre-selected numeric value;

whereby, said sensors are adapted to detect said series of magnetic grid points upon detecting said sentinel and transferring rows and column position of said detected magnetic points to said microprocessor, wherein said microprocessor is programmed to transform said information into numeric data in response thereto.

2. The method according to claim 1 further comprising the step of providing said microprocessor with a series of stored matrices corresponding to said grids and having numerically assigned grid points, the number of said matrices in said series being equal to the number of rows in said grid.

3. The method according to claim 2 wherein said microprocessor is adapted to recognize said selected grid upon detecting the row position of said sentinel.

4. The method according to claim 1 wherein said grid is composed of five rows and a plurality of columns.

5. The method according to claim 1 wherein said sensor and microprocessor are adapted to only detect and process a pre-selected grid point per column regardless of whether other grid points in said column are magnetized.

6. The method according to claim 1 wherein said sensor detects said magnetic points only after detecting said sentinel.

7. The method according to claim 1 wherein said sensors are interposed within a slot, said slot adapted to slidably receive said access card.

8. The method according to claim 1 wherein said sentinel is positioned at the either end of said access card and in one or more or said rows and wherein said magnetic points are detected by said sensors as said card is removed from or passed through said slot after detection of said sentinel.

9. The method according to claim 1 wherein said access card is magnetically encoded such that said sensors are adapted to detect said magnetic points independent of the physical orientation of said access card.

10. The method according to claim 3 wherein the orientation of said access card is directly related to the position of said sentinel as detected by said sensor.

11. The method according to claim 1 further comprising the step of selectively assigning to each of said grid points a magnetic polarity wherein said microprocessor transforms said detected magnetic points and information into numeric data dependent upon said detected polarity.

12. An access control device for controlling a second device comprising:

a main control unit having a programmable microprocessor with memory contained therein, said microprocessor communicating with said second device to be controlled and adapted to receive and decode magnetic data into command signals directed to the operation of said second device;

an access card slot, interposed within said control unit, having one or more openings for access outside of said control unit, said card slot adapted to slidably receive a substantially planar card therein;

an access control card having top and bottom substantially planar surfaces configured to be slidably received within said card slot, said control card further adapted to be magnetized with pre-selected polarity at pre-selected points along a magnetic grid comprising rows and columns interposed on said top and bottom surfaces of said control card;

a magnetized sentinel point, operatively positioned at an end of said access card adjacent to said grid and directly above a pre-selected row or rows of said grid;

grid matrices, electronically stored in said microprocessor memory, said grid matrices comprising a series of numeric values corresponding to each point in said access card magnetic grid, said numeric values being dependent upon the position of said sentinel point and said polarity;

sensing means operatively arranged within said card slot and adapted to detect the presence of said sentinel or sentinels and to recognize the presence and order of said magnetized grid points thereafter, said sensing means further operatively arranged to communicate the order and position of said sentinel and said detected magnetized grid points to said microprocessor;

whereby said magnetic information is detected by said sensor from said access card and transmitted to said microprocessor where said information is decoded into a numeric value and attendant command signal.

13. The device according to claim 12 wherein said sensor detects said magnetic points using the Hall effect.

14. The device according to claim 12 wherein said access card is comprised of a substantially planar sheet of barium ferrite interposed between top and bottom sheets of magnetically inert material.

15. The device according to claim 12 wherein said numeric matrices correspond to a grid having five rows and a plurality of columns.

16. The device according to claim 12 wherein said matrices comprise a series of assigned numeric grid values corresponding to a base numbering system of one less than the number of rows in said grid.

17. The device according to claim 12 wherein said row or rows containing said sentinel or sentinels contains no further magnetically encoded points.

18. The device according to claim 17 wherein said microprocessor decodes only a single magnetic point in a pre-selected row of each column.

19. The device according to claim 12 wherein said sentinel is positioned at the distal end of said access card.

20. The device according to claim 19 wherein said sensor detects said magnetic points only after detecting said sentinel and as said access card is slidably removed from said slot.

21. In an access control system having a control unit including a programmable microprocessor with memory for decoding electronic data into command signals for controlling a second device, a sensor for sensing magnetic grid points on an access card for restricting access to said device to be controlled, the method for coding data on said access card comprising the steps of:

providing an access card adapted to be magnetized at pre-selected points;

selectively arranging said magnetic points in a grid comprising rows and columns;

randomly assigning to points on said grid a numeric value having a number base equal to one less than the number of rows in said grid;

magnetizing appropriate points on said grid corresponding to a pre-selected value stored in said microprocessor in the form of a numeric matrix identical to the grid on said card;

whereby said sensor detects magnetic points having a specific numeric value for decoding and command generation by said microprocessor.

22. The method according to claim 21 further comprising the step of providing a magnetic sentinel point adjacent to said grid and over a pre-selected row thereof, said position of said sentinel used by said microprocessor to determine the orientation of said access card and the numeric values of said grid points for purposes of generating said commands.

* * * * *